(12) United States Patent
Ghemawat et al.

(10) Patent No.: US 8,996,517 B2
(45) Date of Patent: *Mar. 31, 2015

(54) PERMITTING USERS TO REMOVE DOCUMENTS

(71) Applicant: Google Inc., Mountain View, CA (US)

(72) Inventors: Sanjay Ghemawat, Mountain View, CA (US); John Piscitello, Mountain View, CA (US); Simon Tong, Mountain View, CA (US); Matt Cutts, Mountain View, CA (US)

(73) Assignee: Google Inc., Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/858,537

(22) Filed: Apr. 8, 2013

(65) Prior Publication Data

US 2013/0332455 A1    Dec. 12, 2013

Related U.S. Application Data

(63) Continuation of application No. 11/208,005, filed on Aug. 22, 2005, now Pat. No. 8,417,697.

(51) Int. Cl.
  *G06F 7/00*   (2006.01)
  *G06F 17/30*  (2006.01)
(52) U.S. Cl.
  CPC ...... *G06F 17/3053* (2013.01); *G06F 17/30867* (2013.01)
  USPC ............................ 707/732; 707/723; 707/706
(58) Field of Classification Search
  None
  See application file for complete search history.

(56) References Cited

U.S. PATENT DOCUMENTS

| | | |
|---|---|---|
| 5,724,567 A | 3/1998 | Rose et al. |
| 6,285,999 B1 | 9/2001 | Page |
| 6,345,361 B1 | 2/2002 | Jerger et al. |
| 6,487,553 B1 | 11/2002 | Emens et al. |
| 6,601,057 B1 | 7/2003 | Underwood et al. |
| 6,999,959 B1 | 2/2006 | Lawrence et al. |
| 2004/0006710 A1 | 1/2004 | Pollutro et al. |
| 2004/0122947 A1 | 6/2004 | Banerjee et al. |
| 2004/0124977 A1 | 7/2004 | Biffar |
| 2004/0177127 A1 | 9/2004 | Seraphin |
| 2004/0254928 A1 | 12/2004 | Vronay et al. |
| 2005/0216457 A1 | 9/2005 | Walther et al. |
| 2005/0240857 A1 | 10/2005 | Benedict et al. |

(Continued)

FOREIGN PATENT DOCUMENTS

| | | |
|---|---|---|
| CN | 1571966 A | 1/2005 |
| WO | WO 01/46868 A2 | 6/2001 |

OTHER PUBLICATIONS

Welcomely with Filtertechnics; www.filtertechnics.de; Filtertechnics'Googlefilter; Aug. 9, 2005 (print date); 1 page.

(Continued)

*Primary Examiner* — Robert W. Beausoliel
*Assistant Examiner* — Hexing Liu
(74) *Attorney, Agent, or Firm* — Harrity & Harrity, LLP

(57) ABSTRACT

A system may present information regarding a document and provide an option for removing the document. The system may also receive selection of the option and remove the document when the option is selected. The system may aggregate information regarding documents that have been removed by a group of users and assign scores to a set of documents based on the aggregated information.

20 Claims, 19 Drawing Sheets

(56) References Cited

U.S. PATENT DOCUMENTS

2006/0161524 A1 7/2006 Roy et al.
2006/0230021 A1 10/2006 Diab et al.

OTHER PUBLICATIONS

Google Help Center; www.google.com; Google Help: Search Preferences; Aug. 9, 2005 (print date); 2 pages.
Google Toolbar; http://toolbar.google.com; Google Toolbar Features; Aug. 9, 2005 (print date); 5 pages.
Promodo; www.promodo.com; SEO News—Search Engine Optimization News; Oct. 5, 2005; 2 pages.
SearchEngineWatch; Yahoo Introduces Personal Search; http://searchenginewatch.com; Oct. 5, 2004; 4 pages.
Yahoo!, My Web BETA Features; http://myweb.search.yahoo.com; Aug. 8, 2005 (print date); 1 page.
Yahoo!, My Web BETA FAQ; http://myweb.search.yahoo.com; Aug. 8, 2005 (print date); 5 pages.
Daily SEO Blog; "Yahoo! Block"; www.seomoz.org; Jun. 18, 2005; 1 page.
Stefanie Olsen; "Google may let surfers rank search results"; www.news.com; May 27, 2002; 3 pages.
Zoltan Gyongyi et al.; "Combating Web Spam with TrustRank"; Stanford University; Mar. 1, 2004; 21 pages.
Hui Zhang et al.; "Improving Eigenvector-Based Reputation Systems Against Collusions"; Department of Computer Science, University of Southern California; Oct. 7, 2004; 21 pages.
Dennis Fetterly et al.; Spam, Damn Spam, and Statistics; Seventh International Workshop on the Web Databases; Jun. 17-18, 2004; 6 pages.
Andrew Westbrook; "Using Semantic Analysis to Classify Search Engine Spam"; www.standford.com; Mar. 8, 2003 (print date); 8 pages.
International Search Report for corresponding PCT application; dated Jan. 23, 2007; 4 pages.

PERMITTING USERS TO REMOVE DOCUMENTS

RELATED APPLICATION

This application is a continuation of U.S. application Ser. No. 11/208,005, filed Aug. 22, 2005, the disclosure of which is incorporated herein by reference.

BACKGROUND

1. Field of the Invention

Implementations relate generally to information retrieval and, more particularly, to the removing of certain documents from search results and/or general access.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are identified as search results and are returned to the user as links.

Sometimes the search results include a web page that the user deems undesirable. This web page may be deemed undesirable by the user because the web page is spam, the web page relates to content unrelated to the user's interests, the web page contains content that the user dislikes or finds offensive, or for some other reason.

SUMMARY

According to one aspect, an automated method may include presenting information regarding a document; providing an option for removing the document for only a current search or session; receiving selection of the option; and removing the document for only the current search or session when the option is selected.

According to another aspect, a method performed by a device is provided. The method may include providing a remove feature selectable object within a web browser application window; providing a document or a list of search result documents within the web browser application window; receiving selection of the remove feature selectable object; and adding information regarding the document or a search result document in the list of search result documents to a remove list maintained by the device.

According to a further aspect, a computer-readable medium that stores instructions executable by a client device is provided. The computer-readable medium may include instructions for causing the client device to receive a search query; instructions for causing the client device to obtain a list of search result documents based on the search query; instructions for causing the client device to determine whether one of the search result documents in the list of search result documents is on a remove list; instructions for causing the client device to remove the one of the search result documents from the list of search result documents to create a modified list of search result documents when the one of the search result documents is on the remove list; and instructions for causing the client device to present the modified list of search result documents.

According to another aspect, an automated method may include presenting information regarding a document; providing a first option for removing the document; providing a second option for removing a site associated with the document; receiving selection of the first option or the second option; removing the document when the first option is selected; and removing the site associated with the document when the second option is selected.

According to yet another aspect, a method may include aggregating information regarding documents that have been removed by a group of users; and assign scores to a set of documents based on the aggregated information.

According to a further aspect, a method may include receiving a search query and identifying search result documents based on the search query. The method may also include associating with each of the search result documents one or more selectable objects, where the one or more selectable objects permit selection regarding whether the associated search result document or a site associated with the search result document is to be removed and whether the search result document or the site is to be removed for a current search or all searches. The method may also include presenting the search result documents and the associated one or more selected objects as a list of search result documents.

According to another aspect, a system may include means for presenting information regarding a document, means for providing an option for removing the document for a certain period of time, means for receiving selection of the option, means for removing the document during the certain period of time when the option is selected, and means for making the document available after expiration of the certain period of time.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Systems and methods consistent with the principles of the invention may provide a remove feature by which a user can indicate a dislike for a document. Such information can then be used to remove the document from the user's browser, including its appearance in search results, so that the user does not need to view that document again. This information may also be collected from a group of users and used to improve the quality of search results for the group or another group of users.

Figure 1:
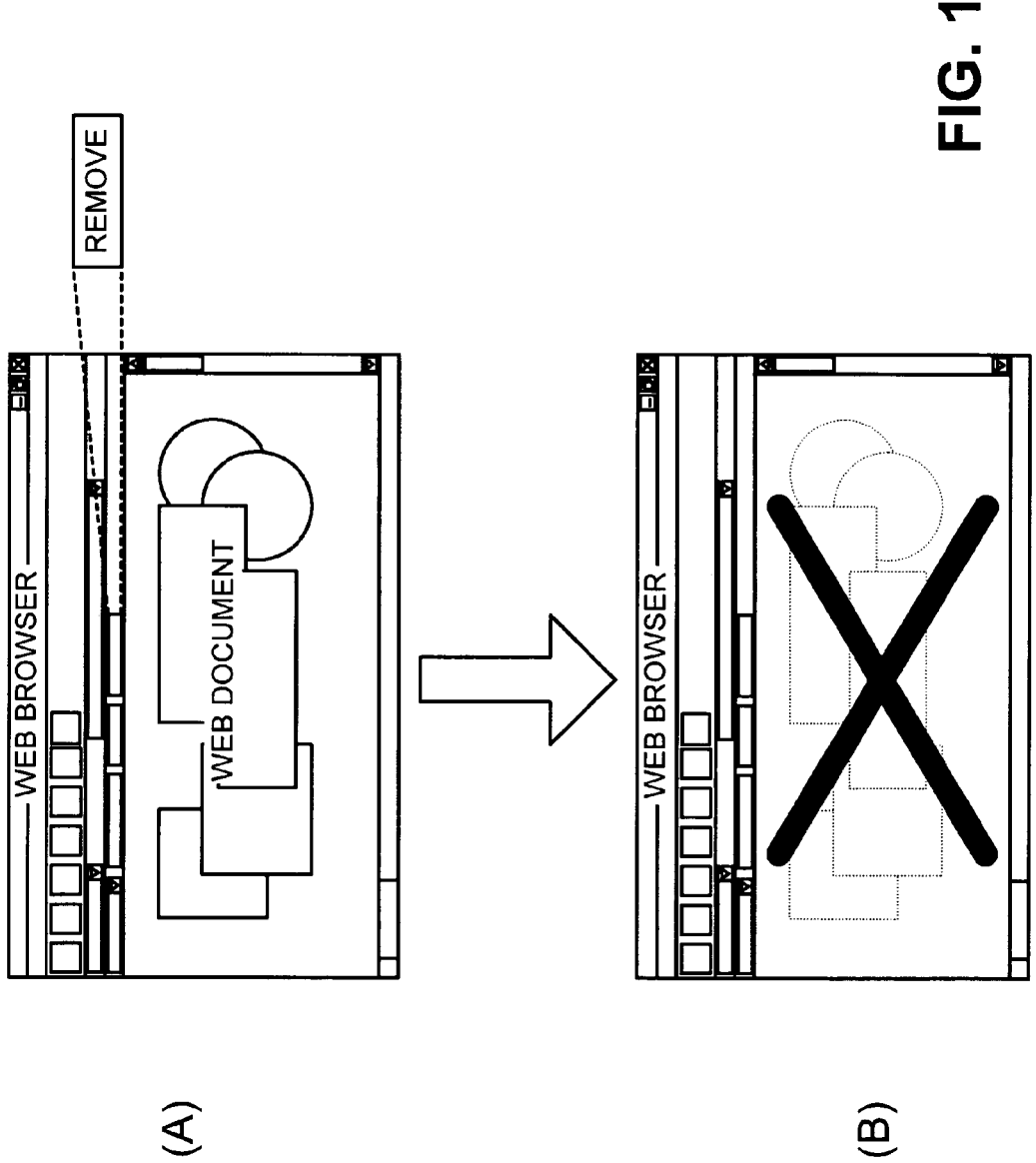
FIG. 1 is an exemplary diagram illustrating a concept consistent with the principles of the invention.

FIG. 1 is an exemplary diagram illustrating a concept consistent with the principles of the invention. As shown at (A), a user may access a web document, such as a web page, using a web browser. As also shown at (A), the web browser includes functionality associated with a "REMOVE" feature. The REMOVE feature may permit the user to indicate a dislike for the web document presented within the web browser display. As shown at (B), selection or activation of the REMOVE feature may effectively cause the web document to disappear. For example, the web document will no longer be accessible by the user (unless the user indicates that the user has changed her mind) and will not show up in search results for searches performed by the user.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
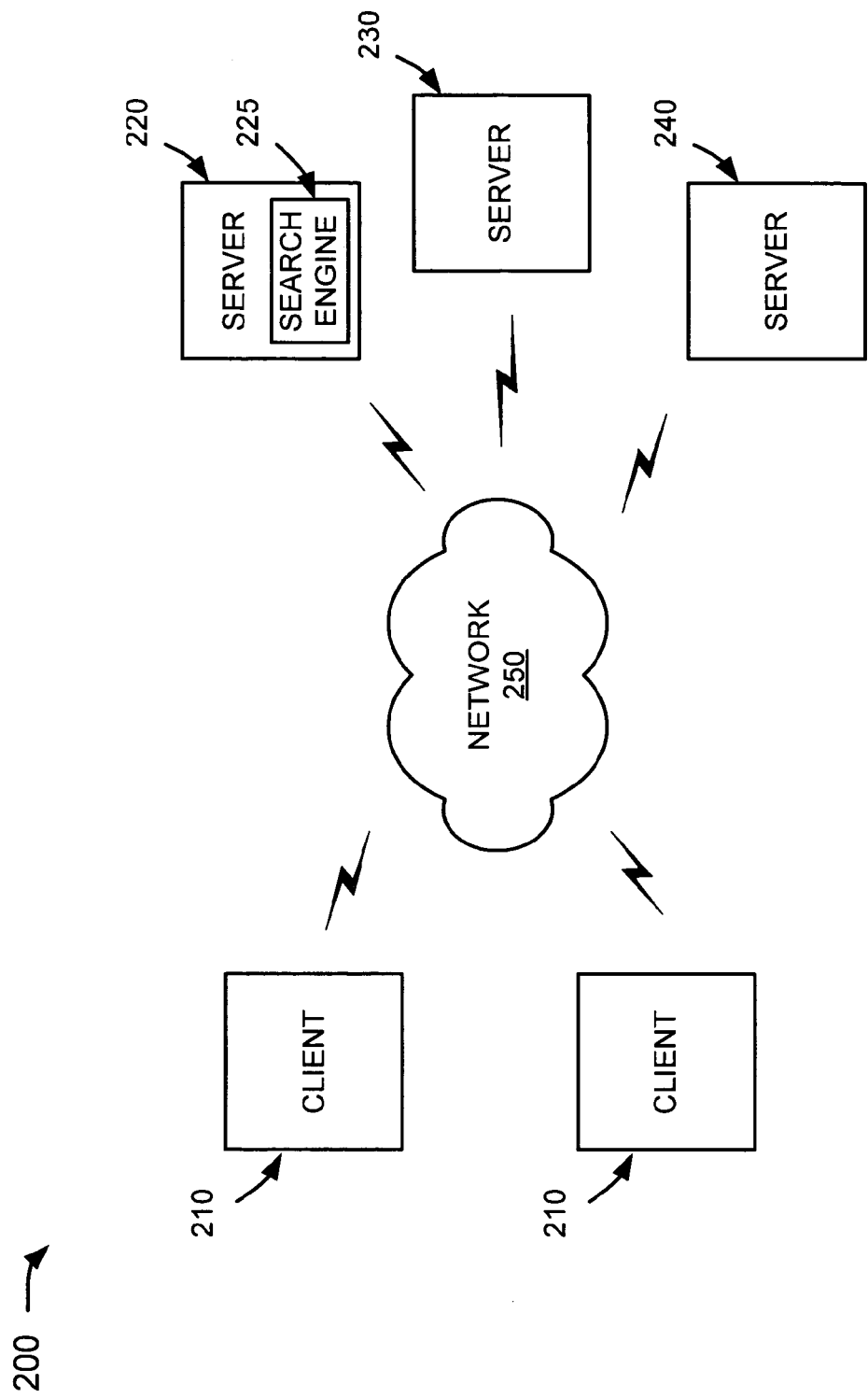
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. Server 220 may crawl a corpus of documents, index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
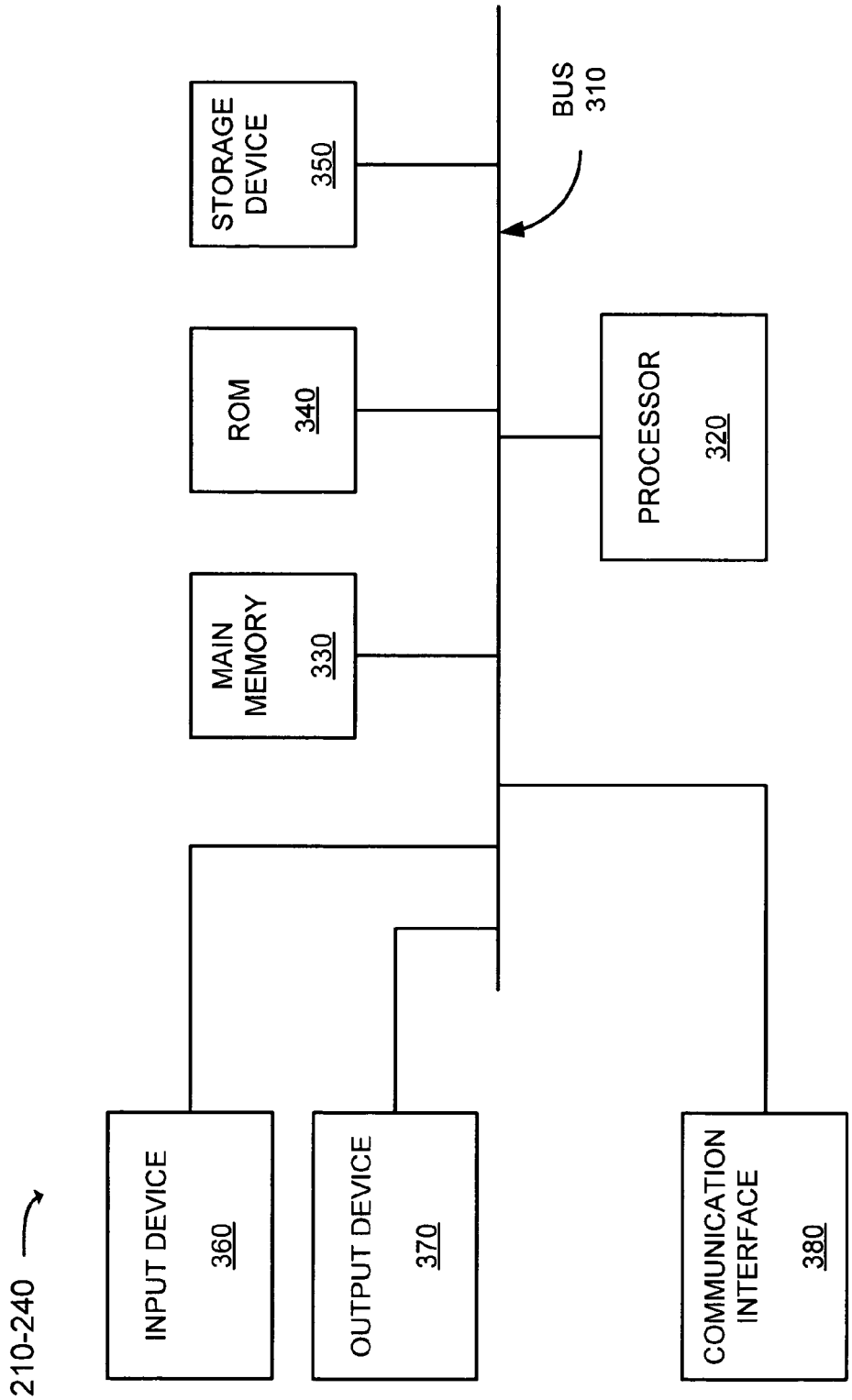
FIG. 3 is an exemplary diagram of a client or server of FIG. 2.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
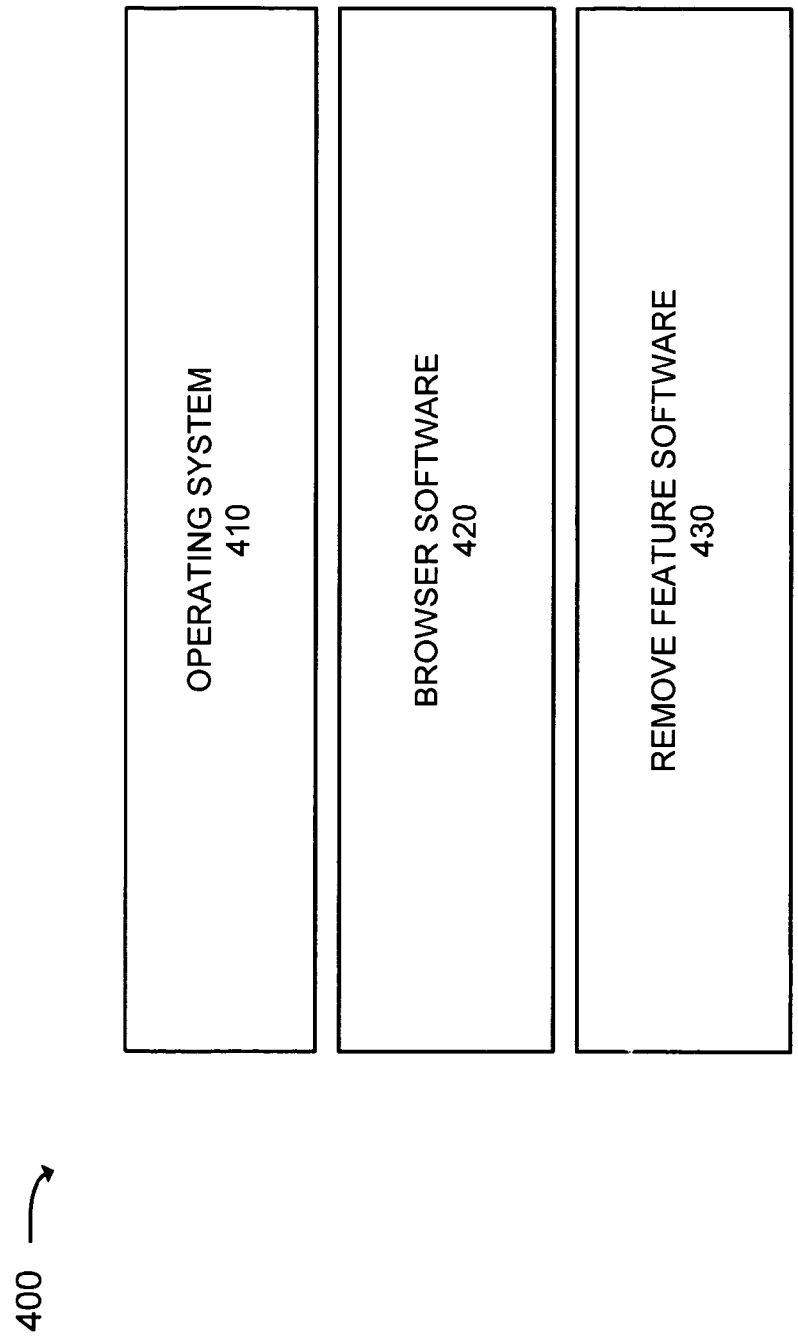
FIG. 4 is a diagram of a portion of an exemplary computer-readable medium that may be used by a client of FIG. 2.

FIG. 4 is a diagram of a portion of an exemplary computer-readable medium 400 that may be used by a client 210. In one implementation, computer-readable medium 400 may correspond to memory 330 of a client 210. The portion of computer-readable medium 400 illustrated in FIG. 4 may include an operating system 410, browser software 420, and remove feature software 430.

Operating system 410 may include operating system software, such as the Windows, Unix, or Linux operating systems. Browser software 420 may include software associated with a web browser, such as the Microsoft Internet Explorer, Netscape Navigator, or Mozilla Firefox browser.

Remove feature software 430 may include a plug-in, an applet, a dynamic link library (DLL), a bookmark, or a similar executable object or process. Client 210 may obtain the executable object or process from server 220 or from a third party, such as a third party server, disk, tape, network, CD-ROM, etc. Alternatively, the executable object or process may be pre-installed on client 210.

Remove feature software 430 may cause a user interface object, such as a toolbar button, a menu item, a link, a frame, etc., to be presented within a web browser window. The user interface object may operate in conjunction with the web browser. In another implementation, the user interface object is part of the web browser. In this latter implementation, the web browser may perform the functions of the user interface object. In yet another implementation, the user interface object is a process separate from the web browser. For example, the user interface object may interface between the web browser and network 250.

Remove feature software 430 may be automatically activated upon initiation of the web browser. Alternatively, remove feature software 430 may be activated when instructed by a user. In either case, the remove feature may take the form of a user interface object, examples of which are described below.

Figure 5:
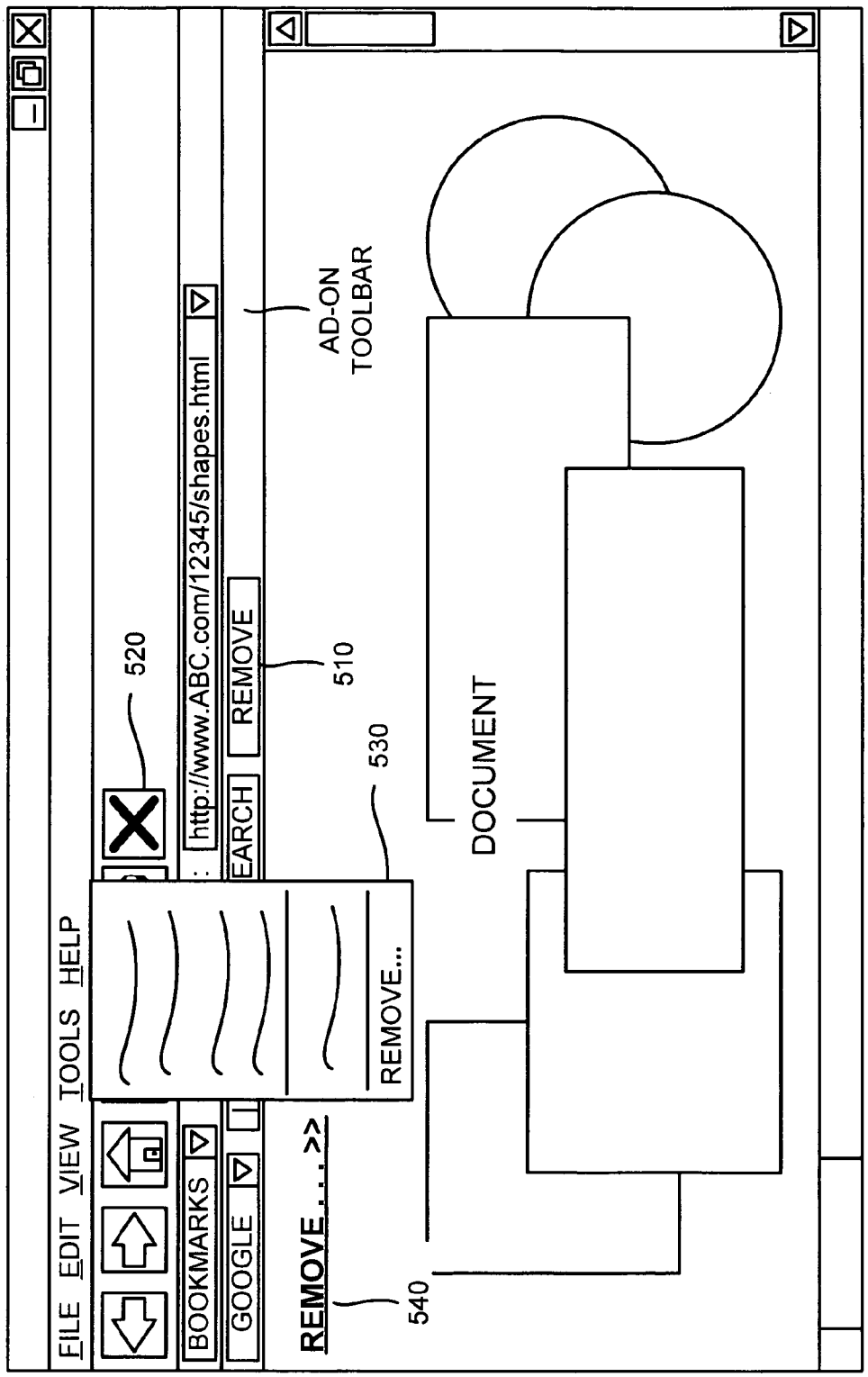
FIG. 5 is an exemplary diagram of a graphical user interface that illustrates various implementations of a remove feature.

FIG. 5 is an exemplary diagram of a graphical user interface that illustrates various implementations of the remove feature. The graphical user interface may, for example, correspond to a web browser window that currently displays a document.

According to one implementation, the remove feature may be implemented as a toolbar button 510 of an add-on toolbar. The add-on toolbar may include one or more search boxes, software buttons, and/or menu elements selectable by a user to initiate different functions by the add-on toolbar. In this case, a user may activate the remove feature function by selecting (e.g., clicking on) toolbar button 510 on the add-on toolbar. According to another implementation, the remove feature may be implemented as a toolbar button 520 of a web browser toolbar. In this case, a user may activate the remove feature function by selecting toolbar button 520 on the browser toolbar. According to yet another implementation, the remove feature may be implemented as a menu item 530 within a menu of a web browser window. In this case, a user may activate the remove feature by selecting menu item 530 within the menu. According to a further implementation, the remove feature may be implemented as a link 540 embedded within the document currently being displayed within a web browser window. In this case, a user may activate the remove feature by selecting link 540. It should be appreciated to those skilled in the other art that in yet other implementations, other mechanisms—which may or may not be integrated within a web browser—for providing the remove feature functionality described herein may be used without departing from the spirit of the present invention.

Figure 6:
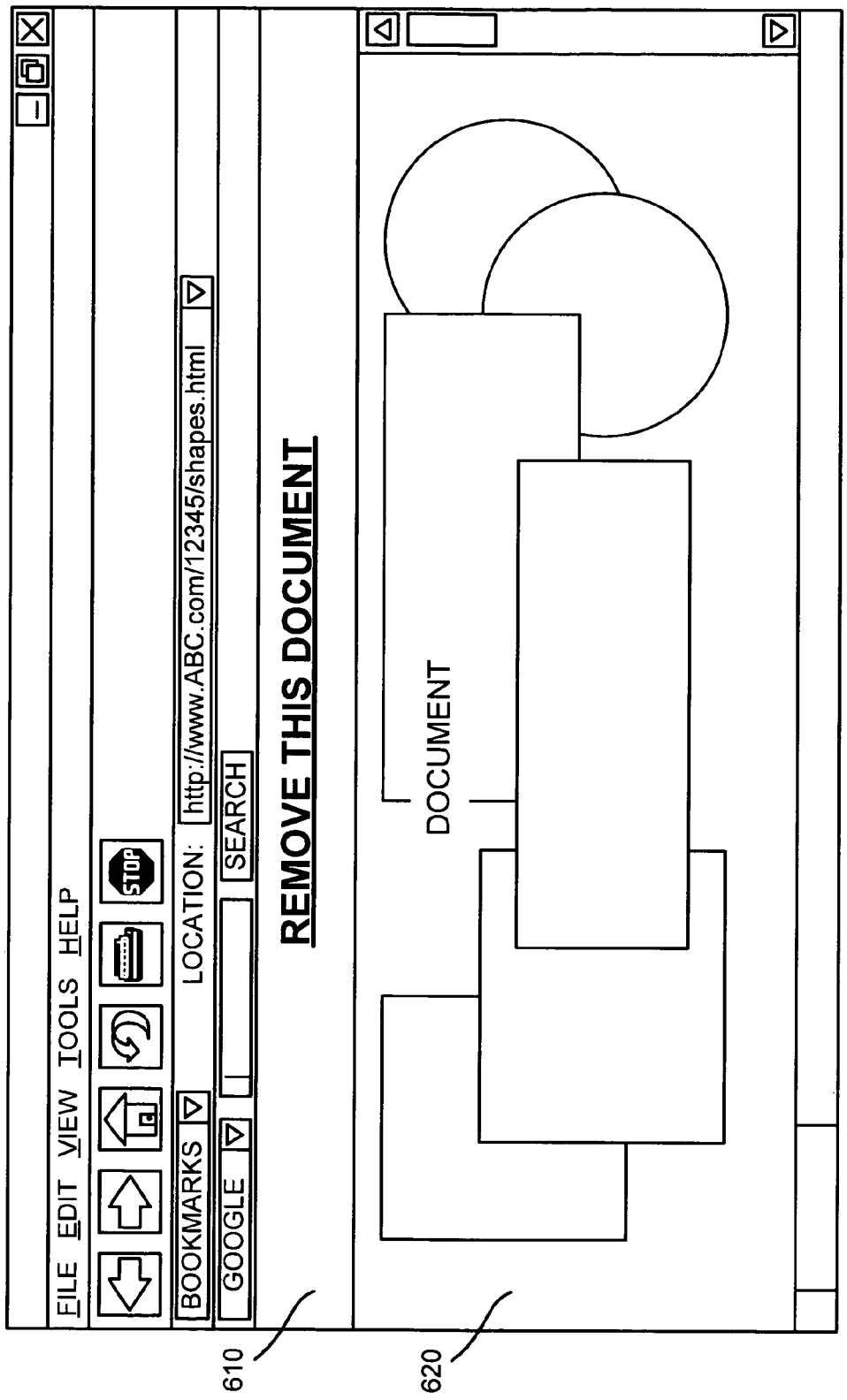
FIG. 6 is an exemplary diagram of a graphical user interface that illustrates another implementation of the remove feature.

FIG. 6 is an exemplary diagram of a graphical user interface that illustrates another implementation of the remove feature. The graphical user interface may again correspond to a web browser window that currently displays a document. According to this implementation, the remove feature may be implemented as a frame 610 within a web browser window. The document may be provided in another frame 620 of the web browser window. Frame 610 may provide an option to remove the document within frame 620. In this case, a user may activate the remove feature function by selecting (e.g., clicking on) the option provided within frame 610.

Figure 7:
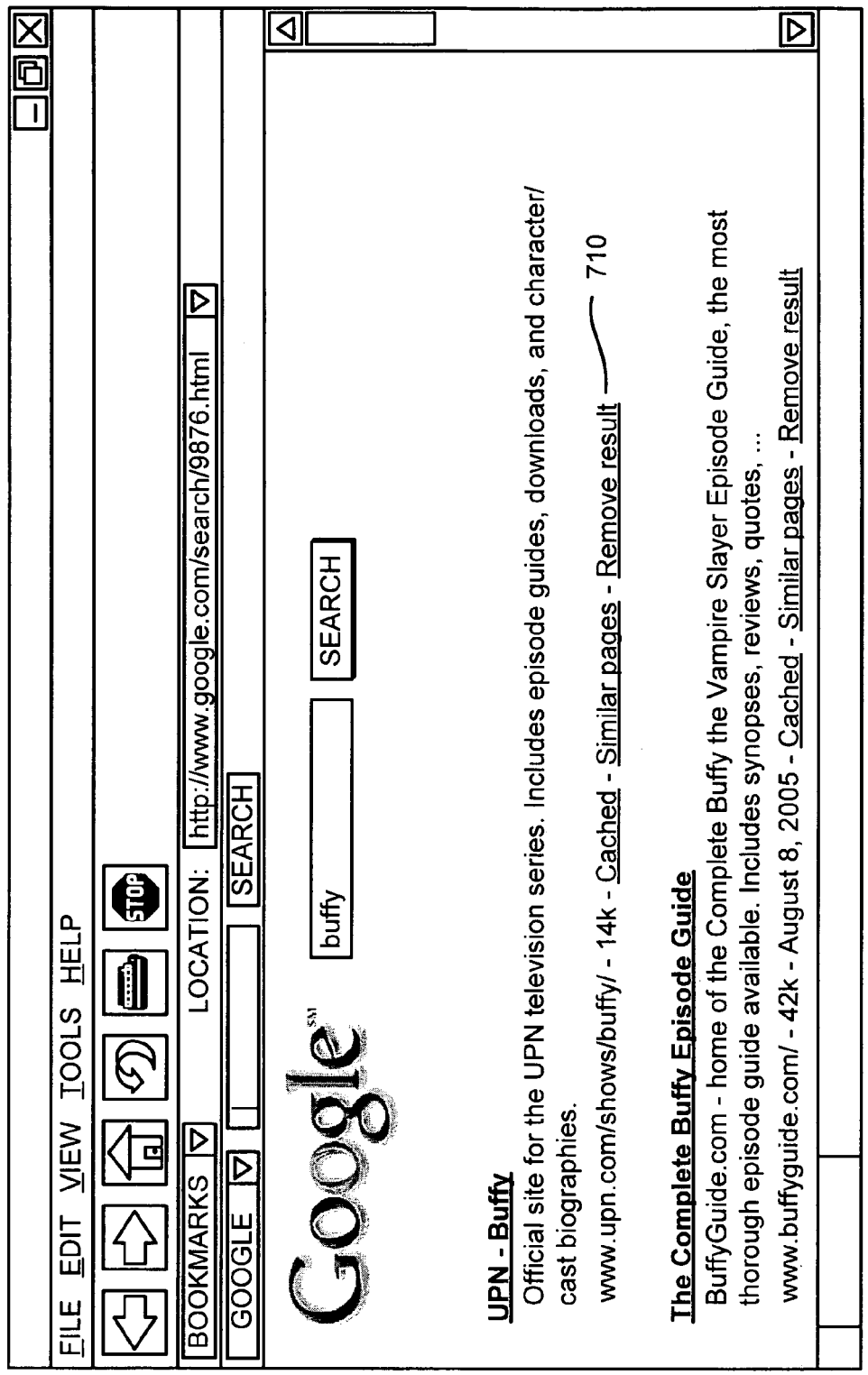
FIG. 7 is an exemplary diagram of a graphical user interface that illustrates yet another implementation of the remove feature.

FIG. 7 is an exemplary diagram of a graphical user interface that illustrates yet another implementation of the remove feature. The graphical user interface may correspond to a web browser window that currently displays a list of search results. The search results may have been obtained from a search engine, such as search engine 225 (FIG. 2). According to this implementation, the remove feature may be implemented as a link 710 associated with a search result. In this case, a user may activate the remove feature function by selecting (e.g., clicking on) link 710 associated with a particular search result.

With regard to any of these implementations, the remove feature may provide a user with a number of options regarding what to remove and how long to remove it. The option regarding what to remove may permit a user to remove this document (i.e., the document displayed within the web browser window or the identified search result document), the site (e.g., the web site) associated with this document, and/or any related documents. "Related documents" may be identified in a number of ways, such as documents of the same type, hosted by the same server, associated with the same domain, or classified the same as the document.

The option regarding how long to remove it may permit the user to identify whether the document/site/related documents is/are to be removed for this search only, for this session only (where "session" may be defined as a sequence of queries or interactions by the same user), or for all searches/sessions. If the user selects to remove the document/site/related documents for this search only, the document/site/related documents will be removed for this search, but will be available for future searches. If the user selects to remove the document/site/related documents for this session only, the document/site/related documents will be removed for this session, but will be available for future sessions. If the user selects to remove the document/site/related documents for all searches/sessions, the document/site/related documents will be removed forever, unless the user later specifies differently.

Alternatively, or additionally, the option regarding how long to remove it may permit the user to identify whether the document/site/related documents is/are to be removed for a certain period of time (possibly independent of the current search and/or session), such as a predetermined number of hours or days. The user may be permitted to define the period of time. If the user selects to remove the document/site/related documents for a certain period of time, the document/site/related documents will be removed for the period of time and will be available after expiration of the period of time.

According to an alternate implementation, the remove feature may, as a default, automatically remove the document currently displayed within the web browser window or the search result document identified by the user for all searches/sessions. If the user desires a different one of the options, the user may be presented with the opportunity (e.g., via a link) to specify the desired option.

According to another implementation, a user may be provided with an option to remove a document or a set of documents for a particular set of queries, subjects or categories of searches, types of document corpa (e.g., general web versus product search documents) etc., but not for others.

Creating a Remove List

Figure 8:
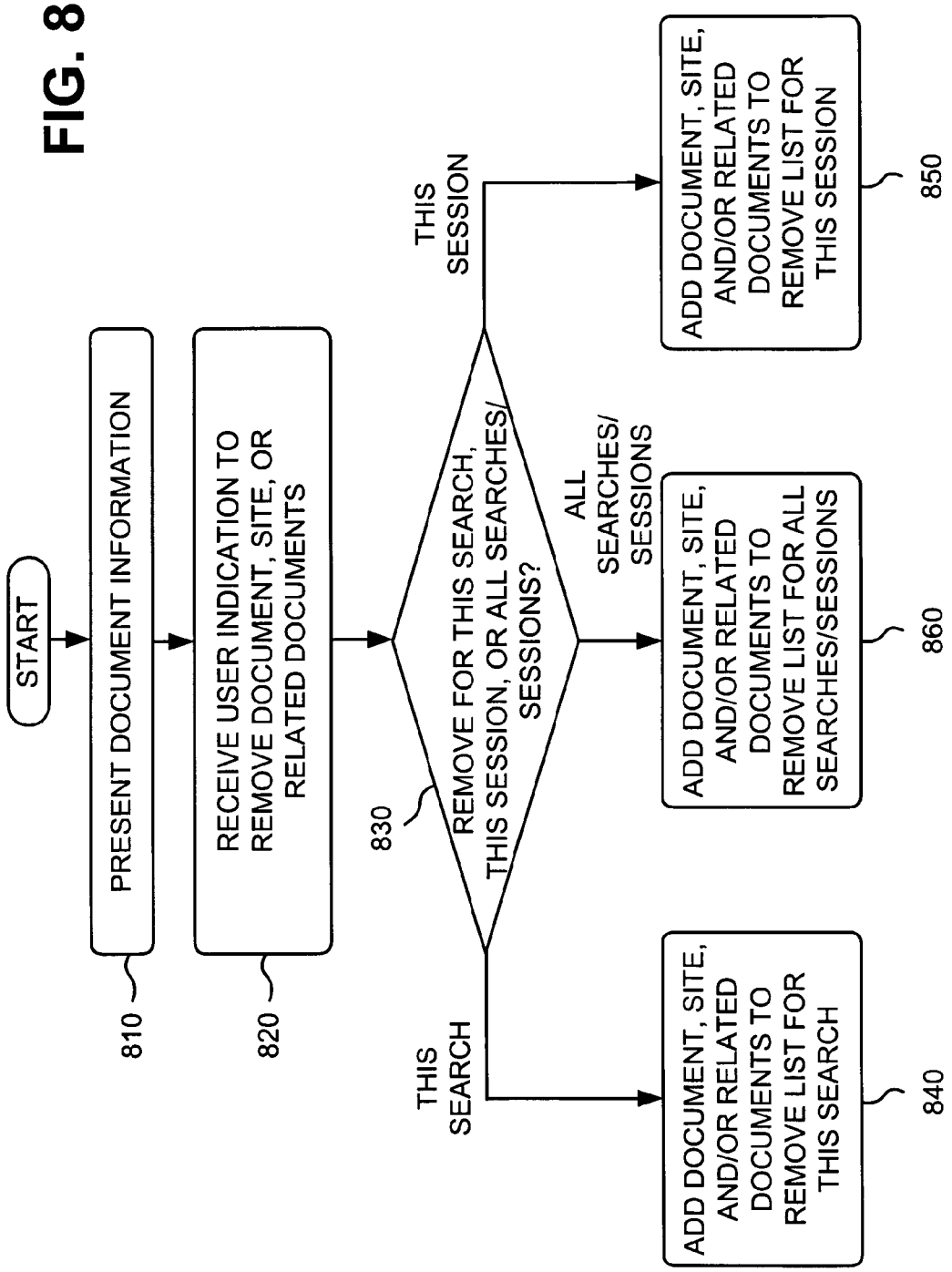
FIG. 8 is a flowchart of an exemplary process for creating a remove list.

FIG. 8 is a flowchart of an exemplary process for creating a remove list. In one implementation, the processing of FIG. 8 may be performed by one or more software and/or hardware components within client 210, server 220, or a combination of client 210 and server 220. In another implementation, the processing may be performed by one or more software and/or hardware components within another device or a group of devices separate from or including client 210 and/or server 220.

Processing may begin with document information being presented to a user (block 810). For example, the user might provide an address to a web browser on a client 210, which may result in a document being displayed within the web browser window. Alternatively, the user might provide a search query to a search engine interface or to a search box of an add-on toolbar, which may result in a list of search results being displayed within the web browser window. In this case, the document may correspond to a search result document in the list of search results.

An indication to remove the document, a site associated with the document, and/or related documents may be received from the user (block 820). For example, the user might express a desire to remove the document or a search result currently displayed within the web browser window. Alternatively, or additionally, the user might express a desire to remove all documents from the same site as the document or a search result currently displayed within the web browser window. Alternatively, or additionally, the user might express a desire to remove documents related to the document or a search result currently displayed within the web browser window. The user might identify his desire in any convenient manner, such as by selecting one or more of several options presented to the user.

An indication to remove the document/site/related documents for this search, this session, or all searches/sessions may be received from the user (block 830). For example, the user might express a desire to remove the document/site/related documents for only the current search. Alternatively, or additionally, the user might express a desire to remove the document/site/related documents for only the current session (i.e., a sequence of queries or interactions). Alternatively, or additionally, the user might express a desire to remove the document/site/related documents for all searches/sessions. The user might identify his desire in any convenient manner, such as by selecting one or more of several options presented to the user.

If the user indicates that the document/site/related documents is/are to be removed for this search only, the document/site/related documents may be added to a remove list for the current search (block 840). For a document, document identifying information, such as an address (e.g., URL), associated with the document may be added to the remove list. For a site, site identifying information, such as one or more addresses (e.g., URLs), associated with the site (e.g., www.website.com/*, where the "*" may represent all documents within the web site www.website.com) may be added to the remove list. For related documents, document identifying information, such as addresses (e.g., URLs), associated with the document and the related documents may be added to the remove list. The remove list may be associated with the user and may be stored on client 210 and/or server 220.

If the user indicates that the document/site/related documents is/are to be removed for this session only, the document/site/related documents may be added to a remove list for the current session (block 850). For a document, document identifying information, such as an address, associated with the document may be added to the remove list. For a site, site identifying information, such as one or more addresses, associated with the site may be added to the remove list. For related documents, document identifying information, such as addresses, associated with the document and the related documents may be added to the remove list. The remove list may be associated with the user and may be stored on client 210 and/or server 220.

If the user indicates that the document/site/related documents is/are to be removed for all searches/sessions, the document/site/related documents may be added to a remove list for all searches/sessions (block 860). For a document, document identifying information, such as an address, associated with the document may be added to the remove list. For a site, site identifying information, such as one or more addresses, associated with the site may be added to the remove list. For related documents, document identifying information, such as addresses, associated with the document and the related documents may be added to the remove list. The remove list may be associated with the user and may be stored on client 210 and/or server 220.

A separate remove list may be maintained for each user. A user might be identified based on a user identifier, such as an IP address associated with client 210 used by the user. Alternatively, the user might be identified based on login information associated with the user. For example, a user might be required to login (and provide, for example, some type of user identifying information (e.g., a username) and password) before using the remove feature for some or all of the different scenarios described herein.

Figure 9:
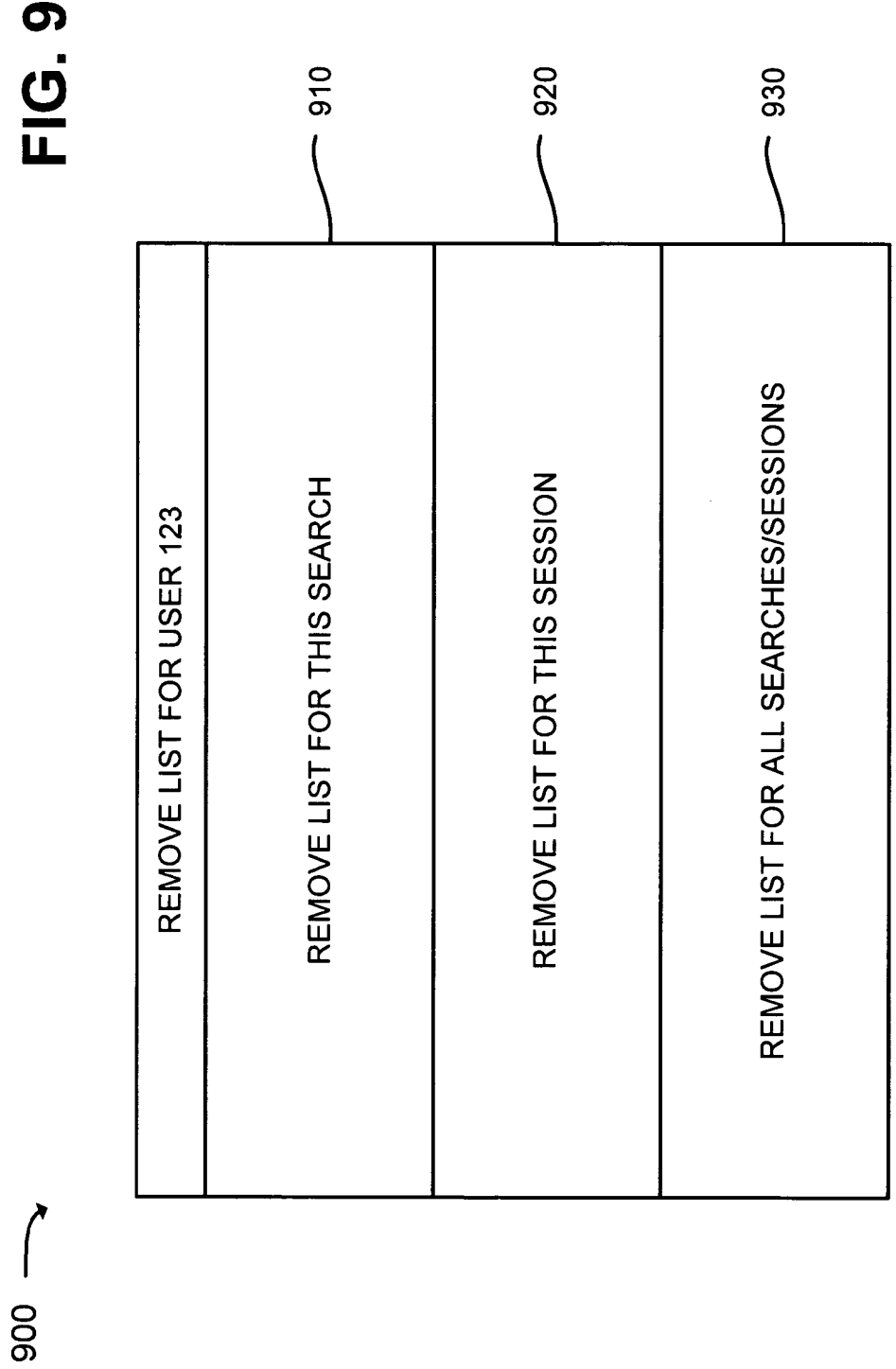
FIG. 9 is an exemplary diagram of a remove list that may be associated with a user.

FIG. 9 is an exemplary diagram of a remove list 900 that may be associated with a user. As shown in FIG. 9, remove list 900 may include a number of sublists, such as a remove list for the current search 910, a remove list for the current session 920, and a remove list for all searches/sessions 930. While remove lists 910-930 are shown as separate lists, these lists may be combined into a single remove list for the user. In this case, information from the separate remove lists 910-930 may be distinguished from one another in some manner.

Remove list for the current search 910 may store document/site identifying information, such as addresses, associated with documents/sites that are to be removed for the current search. Remove list for the current session 920 may store document/site identifying information, such as addresses, associated with documents/sites that are to be removed for the current session. Remove list for all searches/sessions 930 may store document/site identifying information, such as addresses, associated with documents/sites that are to be removed for all searches/sessions.

Presenting a Document

Figure 10:
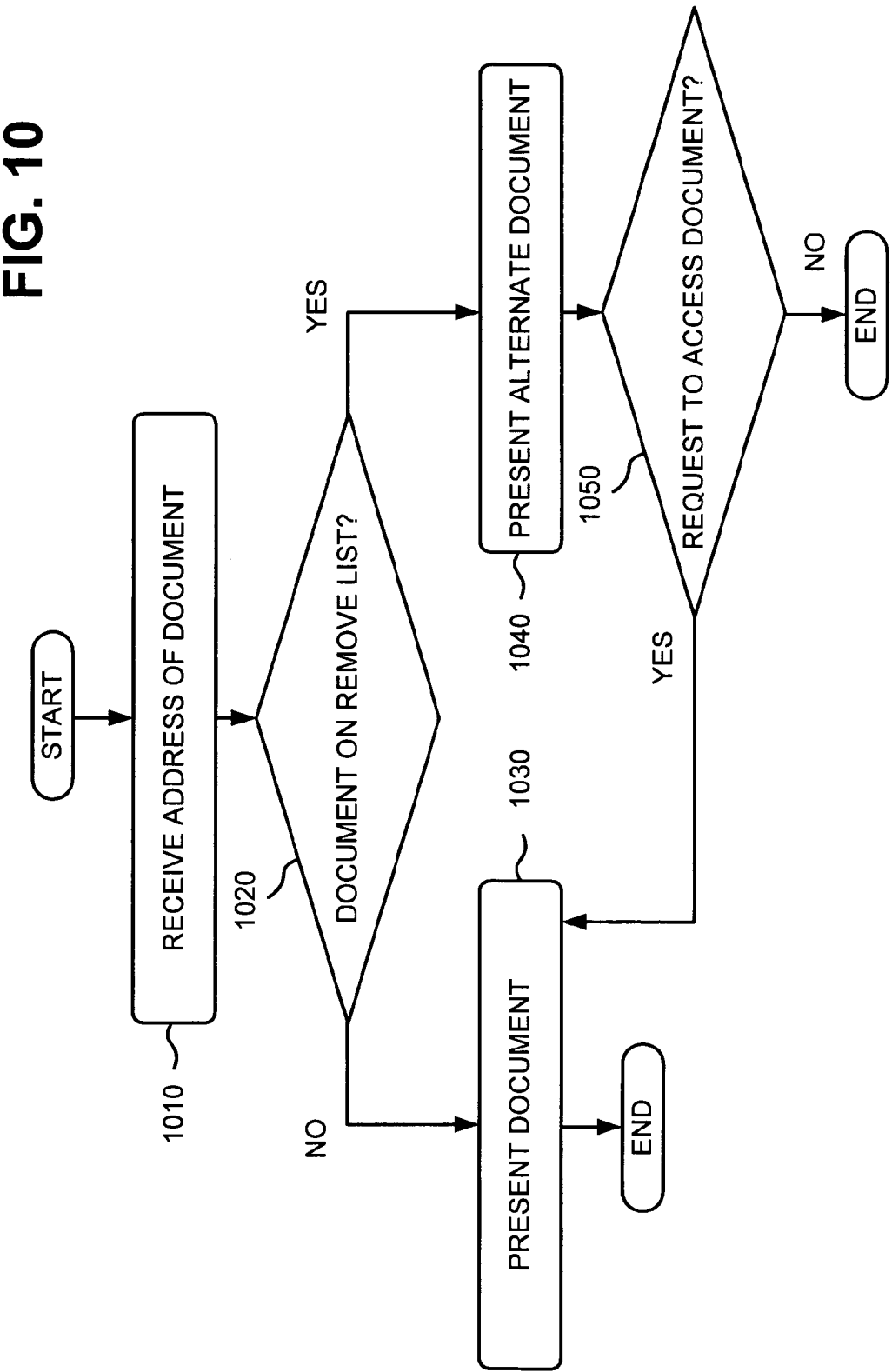
FIG. 10 is a flowchart of an exemplary process for presenting a document.

FIG. 10 is a flowchart of an exemplary process for presenting a document. In one implementation, the processing of FIG. 10 may be performed by one or more software and/or hardware components within client 210, server 220, or a combination of client 210 and server 220. In another implementation, the processing may be performed by one or more software and/or hardware components within another device or a group of devices separate from or including client 210 and/or server 220.

Processing may begin with an address of a document being received (block 1010). For example, the user might provide an address to a web browser on a client 210, which may result in a document being retrieved by the web browser.

It may be determined whether the document is on a remove list (block 1020). For example, the remove list may be analyzed to determine whether the document is listed therein before the document is displayed in, for example, a web browser window. If the document is not listed on the remove list (block 1020—NO), then the document may be presented to the user (block 1030). For example, the document may be displayed in, for example, a web browser window.

If the document is listed on the remove list (block 1020—YES), then the user may be redirected to an alternate document (block 1040). In other words, an alternate document may be presented to the user in place of the document that is on the remove list (i.e., a document that the user previously removed).

Figure 11:
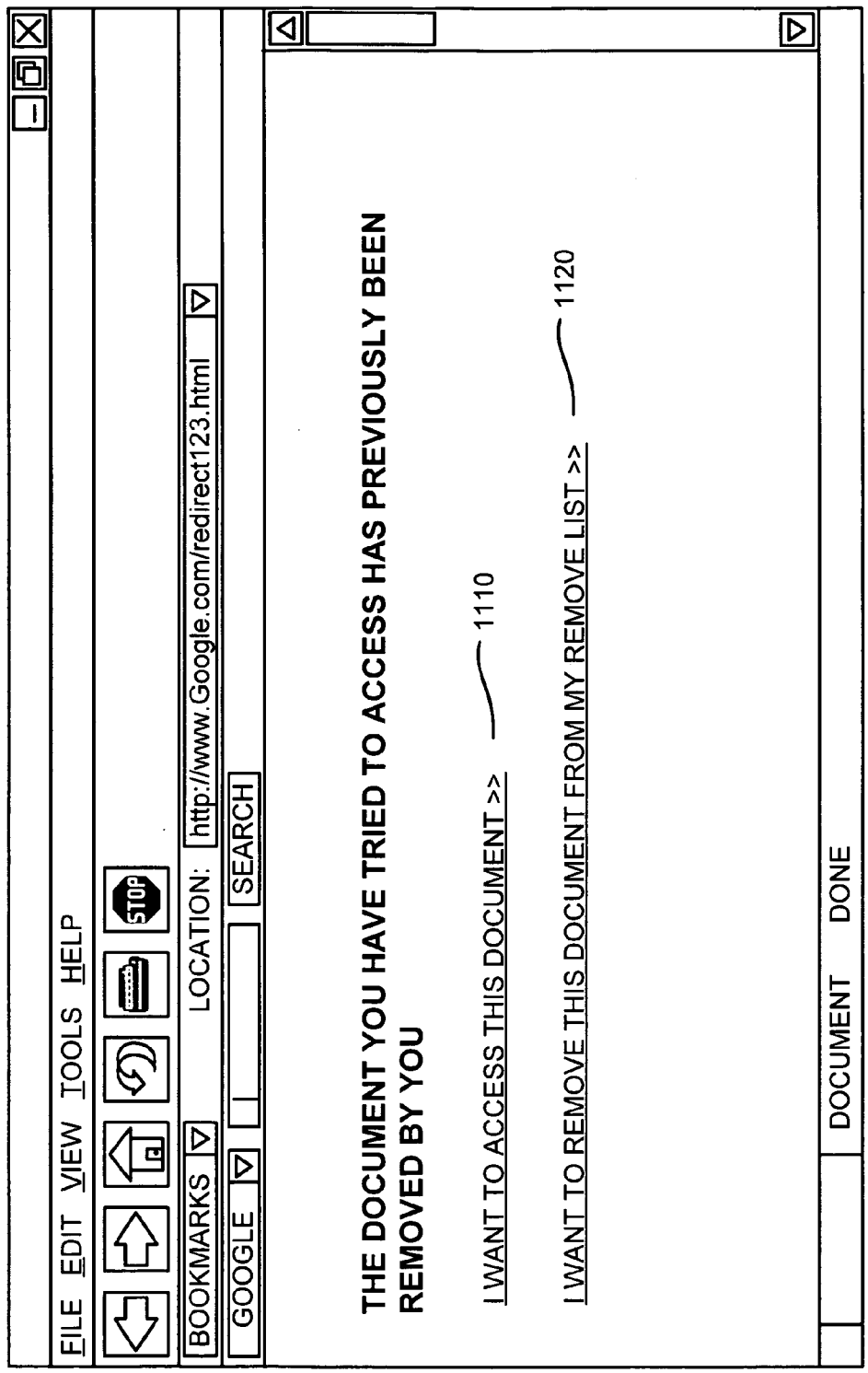
FIG. 11 is an exemplary diagram of an alternate document that may be presented to a user.

FIG. 11 is an exemplary diagram of an alternate document that may be presented to a user. As shown in FIG. 11, the alternate document may include a message that informs the user that the user previously removed the document that the user is currently trying to access. The alternate document may also present the user with an option 1110 to access the document even though the document had been previously put on the remove list by the user. If the user selects option 1110, the document may be presented to the user without removing the document from the remove list. The alternate document may further present the user with an option 1120 to remove the document from the remove list. If the user selects option 1120, the document may be removed from the remove list and possibly also presented to the user.

Returning to FIG. 10, it may be determined whether the user requests to access the document (block 1050). For example, the user might select option 1110 or 1120 (FIG. 11) of the alternate document. If the user requests to access the document (block 1050—YES), then the document may be presented to the user (block 1030). For example, the document may be displayed in, for example, a web browser window. If the user does not request to access the document (block 1050—NO), then processing might end or return to block 1010 upon receipt of another address.

Presenting Search Results

Figure 12:
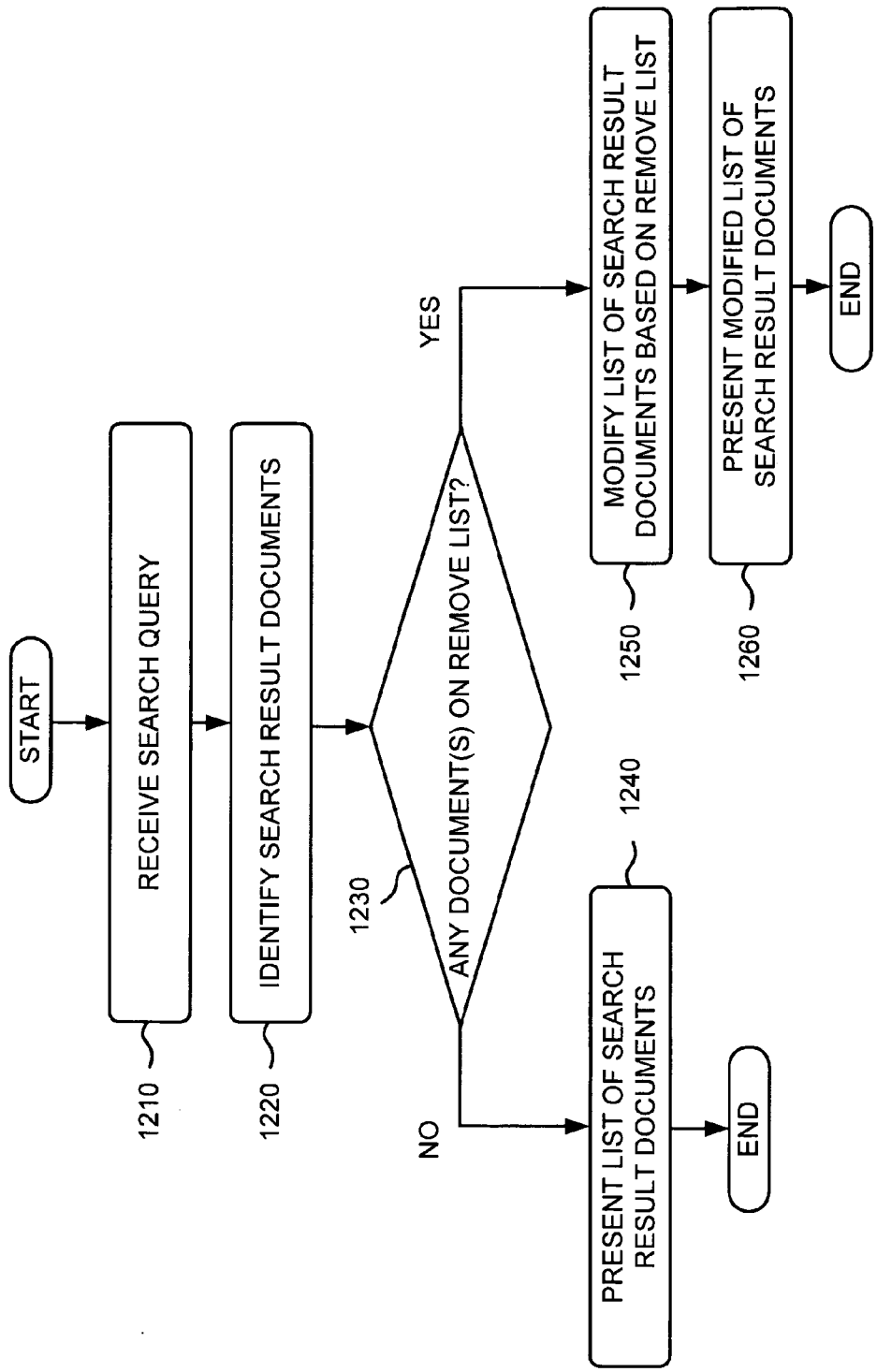
FIG. 12 is a flowchart of an exemplary process for presenting search results.

FIG. 12 is a flowchart of an exemplary process for presenting search results. In one implementation, the processing of FIG. 12 may be performed by one or more software and/or hardware components within server 220, client 210, or a combination of server 220 and client 210. In another implementation, the processing may be performed by one or more software and/or hardware components within another device or a group of devices separate from or including server 220 and/or client 210.

Processing may begin with a search query being received (block 1210). For example, the user may provide a search query into a search box associated with a search engine (e.g., entering a search term into a search engine interface or a search box of an add-on toolbar). The web browser (or the add-on toolbar) may send the search query to a search engine, such as search engine 225 associated with server 220.

A list of search result documents may be identified based on the search query (block 1220). For example, server 220 may perform a search to identify documents that include a search term of the search query. Server 220 may assign scores to the documents, sort the documents based on their scores, and form a list of search result documents based on the sorted documents.

It may be determined whether any of the documents in the list of search result documents is on the user's remove list (block 1230). In one implementation, server 220 may identify the user that submitted the search query based, for example, on an IP address or login information associated with the user. Server 220 may then identify the remove list that is associated with the identified user. Server 220 may compare document identifying information (e.g., an address) associated with each document in the list of search result documents to document identifying information in the remove list.

If none of the search result documents is on the remove list (block 1230—NO), then the list of search result documents may be presented to the user (block 1240). For example, server 220 may transmit the list of search result documents to client 210 for display within a web browser window.

If one or more of the search result documents is/are on the remove list (block 1230—YES), then the list of search results may be modified based on the remove list (block 1250). For example, server 220 may filter the list of search result documents to remove the one or more search result documents on the remove list.

The modified list of search result documents may then be presented to the user (block 1260). For example, server 220 may transmit the modified list of search result documents to client 210 for display within a web browser window. Server 220 may possibly provide information regarding the removed one or more search result documents along with the modified list of search result documents. For example, information regarding the removed one or more search result documents may be displayed within the web browser window in a distinguished manner so that the user can know that certain document(s) has/have been removed from the list of search result documents.

In another implementation, the original list of search result documents may be presented and intercepted by, for example, an add-on toolbar associated with client 210. It may be determined whether any of the documents in the list of search result documents is on the user's remove list (block 1230). In this implementation, the toolbar may identify the user's locally stored remove list and compare document identifying information (e.g., an address) associated with each document in the list of search result documents to document identifying information in the remove list.

If none of the search result documents is on the remove list (block 1230—NO), then the list of search result documents may be presented to the user (block 1240). For example, the toolbar may display the list of search result documents within a web browser window.

If one or more of the search result documents is/are on the remove list (block 1230—YES), then the list of search results may be modified based on the remove list (block 1250). For example, the toolbar may filter the list of search result documents to remove the one or more search result documents on the remove list.

The modified list of search result documents may then be presented to the user (block 1260). For example, the toolbar may display the modified list of search result documents within a web browser window. The toolbar may possibly provide information regarding the removed one or more search result documents along with the modified list of search result documents. For example, information regarding the removed one or more search result documents may be displayed within the web browser window in a distinguished manner so that the user can know that certain document(s) has/have been removed from the list of search result documents.

In addition, a search engine (e.g., the Google search engine) may optionally collect and track removal data from users and use such removal data to score documents for searches by all or a subset (e.g., geographical) users. For example, if a large number of users remove a certain search result for a given set of search queries, the search engine may use that information to adjust the score for that document (for those set of search queries and/or others). In other words, removal data may be used as a scoring signal by a search engine or other search application.

Example

FIGS. 13-17 are exemplary diagrams of a search that may be performed by a user. Assume that a user provides a search query "buffy" to a search engine interface. The search engine may perform a search to identify search result documents that match the search term "buffy." Assume that one of the search result documents (www.upn.com/shows/buffy) is on the user's remove list and is, therefore, removed from the list of search results.

Figure 13:
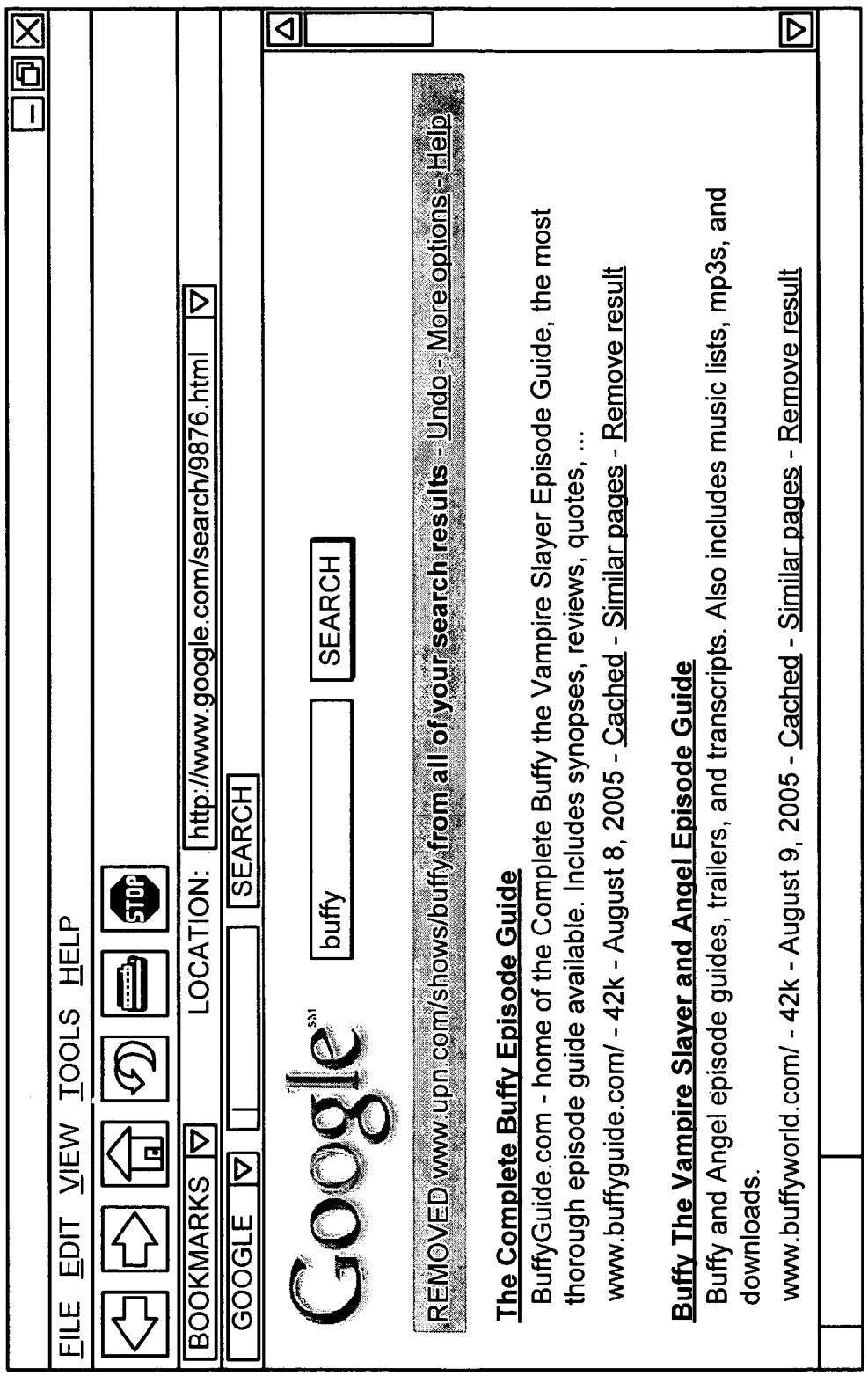
FIGS. 13-17 are exemplary diagrams of information that may be presented to a user.

As shown in FIG. 13, the modified list of search results does not include the search result document www.upn.com/shows/buffy. The modified list of search results provides information that the search result document www.upn.com/shows/buffy has been removed from the list of search results for all searches. In this case, the search result document www.upn.com/shows/buffy is removed for all searches by default. If the user desires a different option, the user may select the "More options" link, as shown in FIG. 13.

Figure 14:
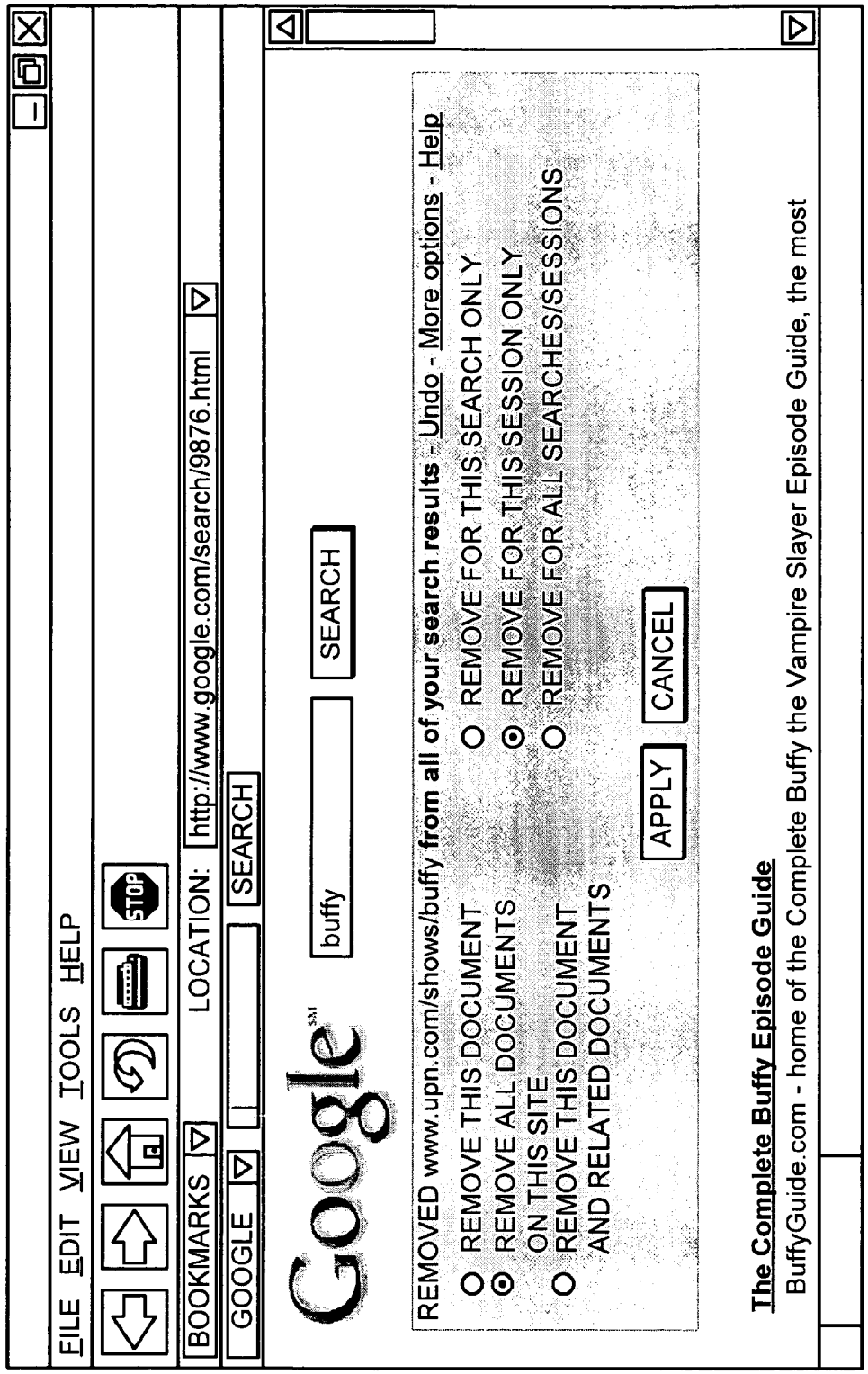

As shown in FIG. 14, the user may be presented with additional options for removing the search result document www.upn.com/shows/buffy. As shown in FIG. 14, the user may be presented with options regarding what to remove and how long to remove it. The options regarding what to remove may include options to remove this document, remove all documents on this site (www.upn.com), or remove this document and any related documents. The options regarding how long to remove it may include options to remove the document/site/related documents for this search only, this session only, or all searches/sessions.

Figure 15:
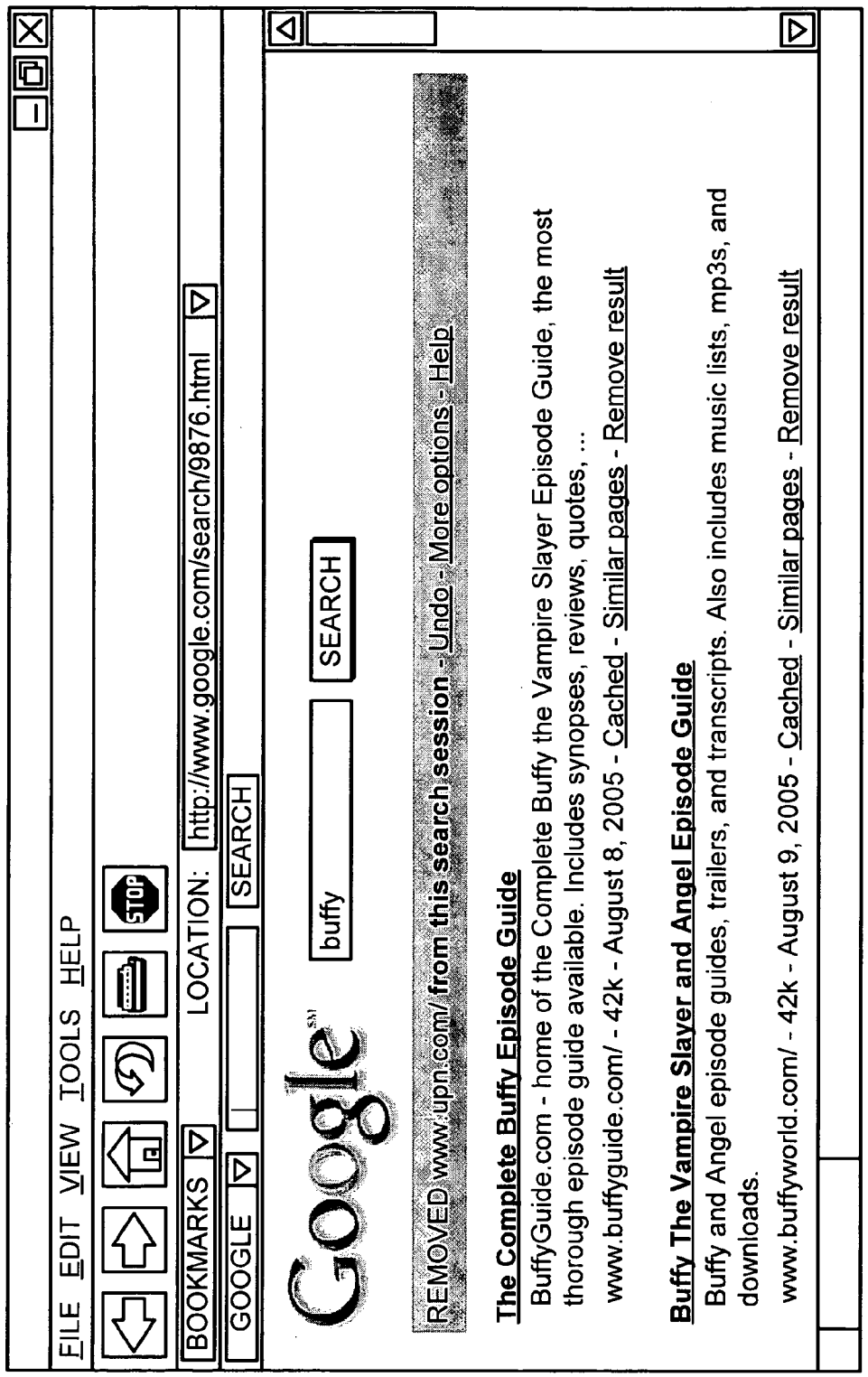

Assume that the user selects to remove all documents on this site (www.upn.com) for this session only. The list of search results may be further modified, if necessary, to remove additional search result documents that are associated with the site www.upn.com. As shown in FIG. 15, the modified list of search results does not include any search result documents associated with the site www.upn.com. The modified list of search results provides information that search result documents associated with the site www.upn.com have been removed from the list of search results for this search session.

Figure 16:
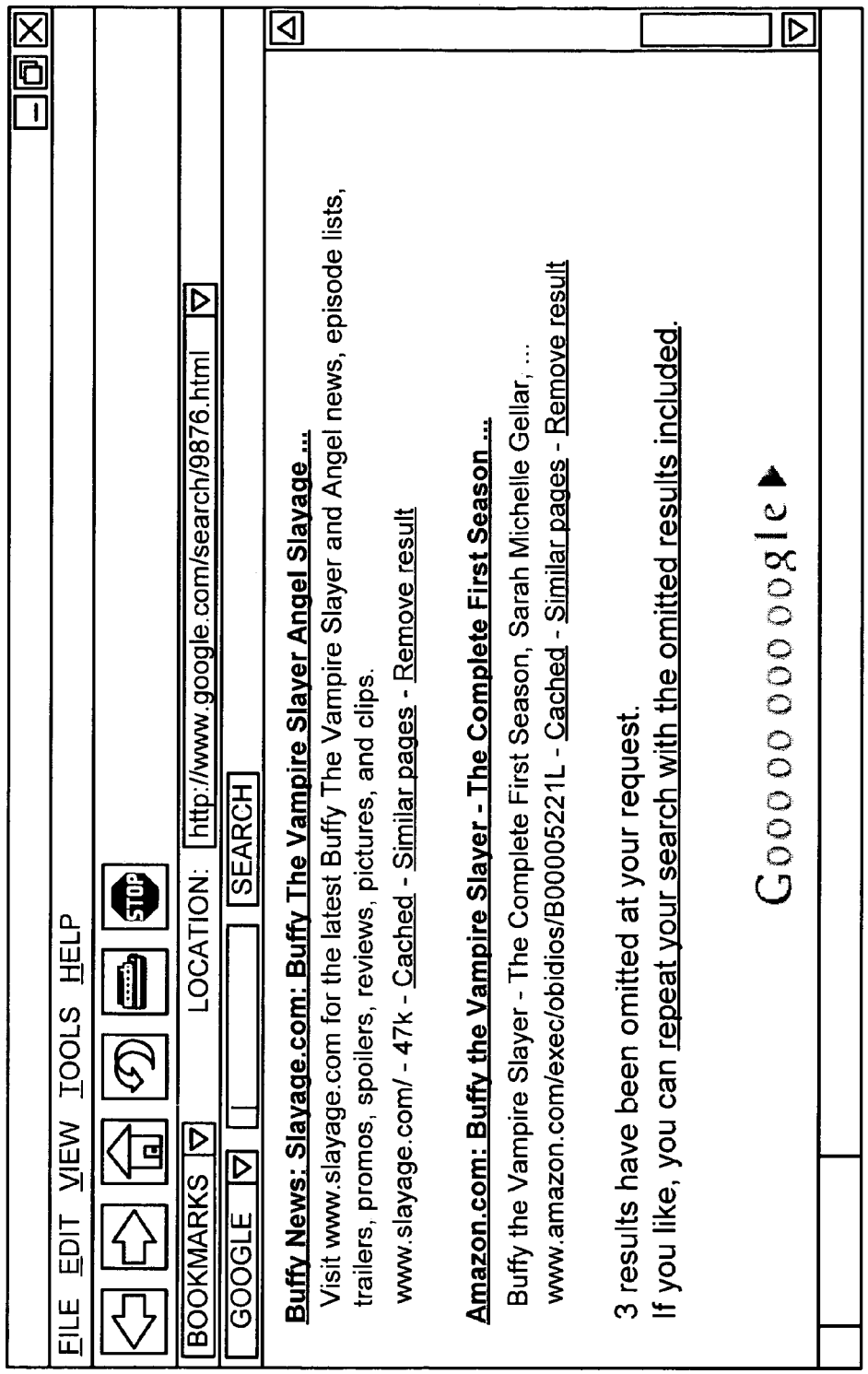

Assume that the modified list of search results included three search result documents associated with the site www.upn.com. As shown in FIG. 16, the user may be presented with information that three search results documents have been removed from the modified list of search results. The user might also be presented with the option to repeat the search with the removed results included. If the user selects this option, the removed search result documents may be added back into the list of search results in their appropriate place (e.g., based on their scores).

It some situations, the user's identification of certain documents for removal may actually be detrimental to the quality of the search results presented to the user. In this case, information regarding a search result document that is determined to be of high quality may be presented to the user even if the document is included in the user's remove list. A document may be determined to be of high quality based on one or more quality factors, such as the document's score (e.g., an information retrieval score and/or link-based score), freshness, number of backlinks, and/or some other signal of quality.

Figure 17:
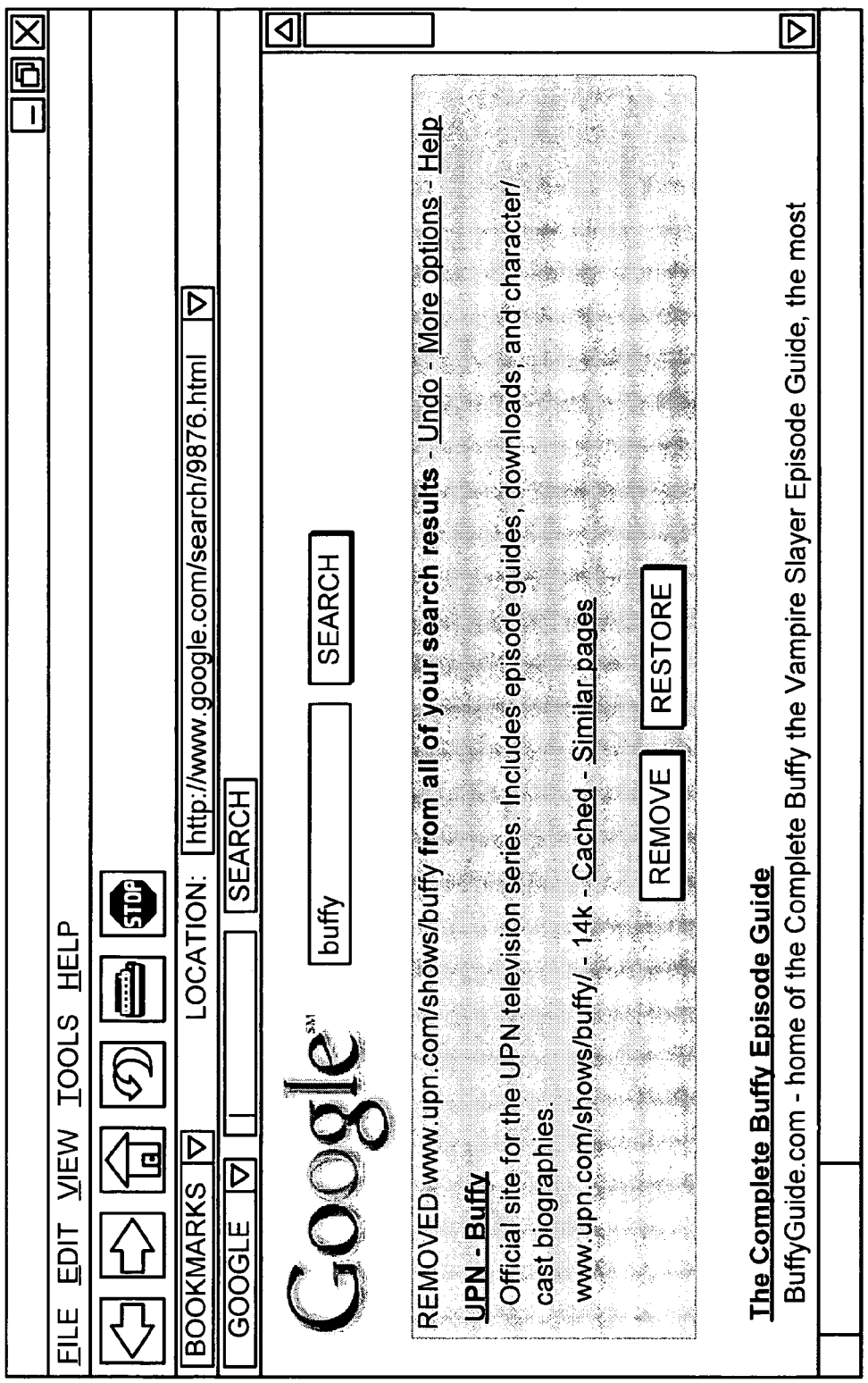

As shown in FIG. 17, the user has previously identified the document www.upn.com/shows/buffy for removal from all searches. Assume that the document www.upn.com/shows/buffy has been identified as a high quality search result document for a search based on the search term "buffy." As shown in FIG. 17, the user may be presented with information regarding the search result document www.upn.com/shows/buffy. For example, the information might be presented in some manner to let the user know that the search result document was removed by the user, such as presenting it as highlighted text, as text in small font, as text at the bottom of the page, as partially transparent text, as text in a color (e.g., light gray) different from the color of the list of search results, as plain text that is not selectable (e.g., clickable), as a list in a place integrated within the web browser window (e.g., in a penalty box) separate from the list of search results, via a mouseover pop-up window, and/or in another manner to distinguish it from the list of search results.

The user might be presented with the option to remove this document from the list of search results or to restore the document to the list of search results. If the user selects the option to remove the document, then a modified list of search results may be presented to the user, similar to that shown in FIG. 13. If the user selects the option to restore the document, then the list of search results may be presented to the user, similar to that shown in FIG. 7.

Improving Search Results

Figure 18:
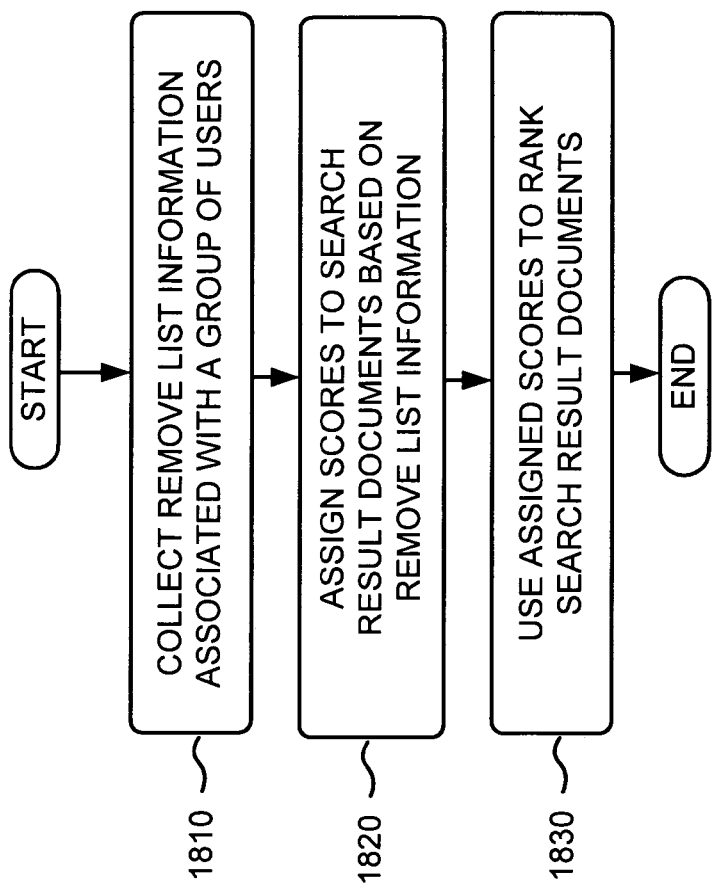
FIG. 18 is a flowchart of an exemplary process for improving search results.

FIG. 18 is a flowchart of an exemplary process for improving search results. In one implementation, the processing of FIG. 18 may be performed by one or more software and/or hardware components within server 220. In another implementation, the processing may be performed by one or more software and/or hardware components within another device or a group of devices separate from or including server 220.

Processing may begin with the collection of remove list information associated with a group of users (block 1810). If the remove lists are stored on clients 210, but not server 220, the remove lists may be transmitted to server 220. If the remove lists are stored on server 220, the information from the remove lists may be aggregated.

In one implementation, remove list information associated with a group of users might be aggregated. For example, remove list information associated with only legitimate users might be aggregated to reduce the effects of spamming. A legitimate user might be distinguished from an illegitimate user (e.g., spammer) based on the amount of time the user spent accessing the search engine, the interactions of the user with the search engine, whether the user has valid login information, whether the user has posted a bond or some sort of deposit, whether the user has built up a reputation or is known in some manner (e.g., has been rated by others), whether the user has a relationship (e.g., a paying relationship like an advertiser) with the search engine, and/or other information that may distinguish a legitimate user from an illegitimate user.

In yet another implementation, remove list information associated with some identified set of users may be aggregated. The identified set of users might include users within a particular geographic region (e.g., users in the United States), users with a defined relationship (e.g., friends within an online community, such as Orkut, contacts within an address book, users associated with a particular web site, users identified by a particular user), etc.

Scores may be assigned to search result documents based on the remove list information (block 1820). In one implementation, at least part of the score assigned to the documents may be independent of any search query (e.g., precomputed) and at least one other part of the score may be dependent on the particular search query involved.

Figure 19:
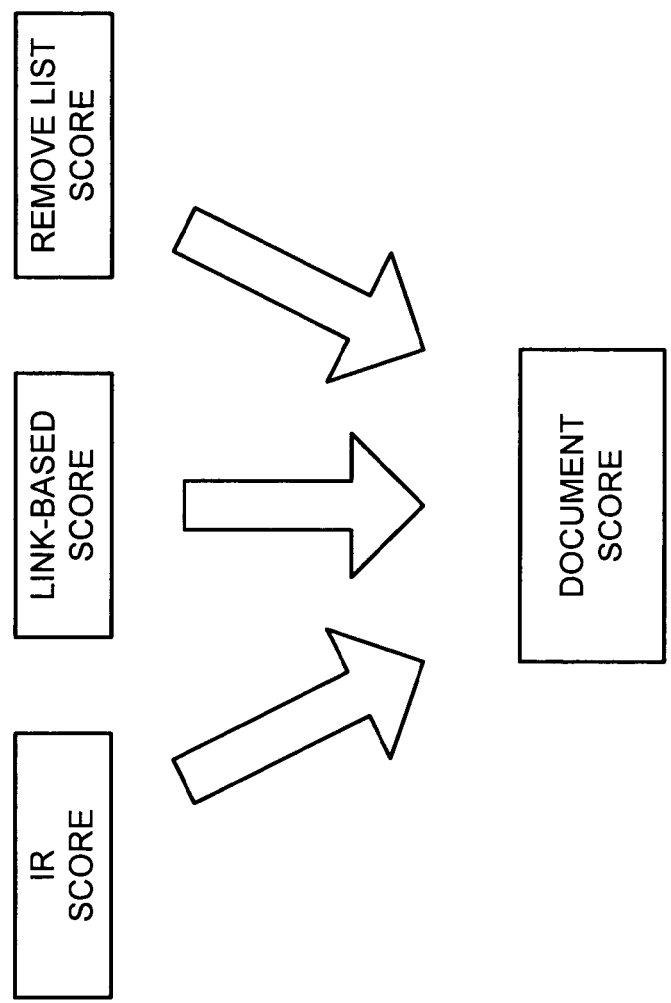
FIG. 19 illustrates one implementation for determining the score for a document.

The score assigned to a document may be based on a function of one or more features associated with the document. FIG. 19 illustrates one implementation for determining the score for a document. As shown in FIG. 19, a document's score may be based on an information retrieval (IR) score, a link-based score, and/or a remove list score.

The IR score for a document may be determined based on a matching of the search terms of a search query to the content of the document. There are a number of known techniques that may be used to determine the IR score for a document. For example, the IR score may be determined based on the number of occurrences of the search terms in the document. Alternatively or additionally, the IR score may be determined based on where the search terms occur within the document (e.g., title, content, etc.) or characteristics of the search terms (e.g., font, size, color, etc.). Alternatively or additionally, a search term may be weighted differently from another search term when multiple search terms are present. Alternatively or additionally, the proximity of the search terms when multiple search terms are present may influence the IR score. Yet other techniques for determining the IR score for a document are known to those skilled in the art.

The link-based score for a document may be determined based on the links associated with the document. Several techniques exist for determining the link-based score of a document. One such technique is described in U.S. Pat. No. 6,285,999, entitled "METHOD FOR NODE RANKING IN A LINKED DATABASE," the contents of which are incorporated herein by reference. Other techniques for determining the link-based score for a document are known to those skilled in the art.

A remove list score for a document may be determined based on remove list information associated with the document. For example, information regarding the number of different users that removed each document and/or information regarding the number of different users that removed each document that also removed documents that a particular user removed (where the particular user may include the user that provided the search query) may be used to determine a remove list score. In one implementation, the remove list information associated with a group of users may be used to determine scores for the group or another group of users (including or separate from the group). For example, when remove list information associated with legitimate users is aggregated, the remove list information may be used to determine scores for documents for all users. Alternatively, when the remove list information associated with users that are contacts within an address book is aggregated, the remove list information may be used to determine scores for one or more of those users.

The IR score, link-based score, and remove list score may be combined in some manner to generate a total score that is assigned to a document. The assigned scores may be used to rank the documents (block 1830). For example, search result documents may be identified and sorted (e.g., ranked) based on their assigned scores. Using the remove list information as a factor in determining the scores assigned to the documents improves the quality of the search results because documents that users found undesirable have been removed from the search results. This may serve to improve the user's search experience.

CONCLUSION

Systems and methods consistent with the principles of the invention may provide a remove feature by which a user can indicate a dislike for a document. This information can then be used to remove the document from future access by the user, including its appearance in search results. This information may also be collected from a group of users and used to improve the quality of search results for all users.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 8, 10, 12, and 18, the order of the acts may be modified in other implementations consistent with the principles of the invention. Further, non-dependent acts may be performed in parallel.

Also, exemplary user interfaces have been described with respect to FIGS. 5-7, 11, and 13-17. In other implementations consistent with the principles of the invention, the user interfaces may include more, fewer, or different pieces of information.

The preceding description refers to a user. A "user" is intended to refer to a client, such as a client 210 (FIG. 2), or an operator of a client.

The preceding description focussed on techniques for removing web documents. The description equally applies to the removal of local documents (i.e., documents local to a client 210). Local documents can be identified by local searching, which is sometimes referred to as desktop searching.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   providing, by one or more devices and for display, information regarding a document;
   providing, by the one or more devices, a first option for removing the document for a particular search,
       the first option being visually displayed in connection with the information regarding the document;
   providing, by the one or more devices, a second option for removing the document for a particular session,
       the second option being visually displayed in connection with the information regarding the document;
   providing, by the one or more devices, a third option for removing the document for at least one of a plurality of searches or a plurality of sessions,
       the third option being visually displayed in connection with the information associated with the document;
   receiving, by the one or more devices, information regarding a selection of the first option, the second option, or the third option; and
   performing, by the one or more devices and based on the selection, one of:
       removing the document for the particular search,
       removing the document for the particular session, or
       removing the document for at least one of the plurality of searches or the plurality of sessions.

2. The method of claim 1, where providing the information regarding the document comprises:
   receiving a search query, and
   providing, based on the search query, the information regarding the document.

3. The method of claim 1, where providing the information regarding the document comprises:
   providing a search results document,
       the search results document including a plurality of search results,
       the plurality of search results including a particular search result for the document, and
       the particular search result for the document including the information regarding the document.

4. The method of claim 1, further comprising:
   performing, based on the selection, one of:
       adding information identifying the document to a first remove list for the particular session, or
       adding the information identifying the document to a second remove list for at least one of the plurality of searches or the plurality of sessions.

5. The method of claim 4, where the second remove list is maintained for a particular user who initiated the particular search.

6. The method of claim 1, where at least one of the plurality of searches or the plurality of sessions include all searches and all sessions.

7. The method of claim 1, further comprising:
   receiving information identifying another document;
   determining that the information identifying the other document is not included in a remove list; and
   providing information regarding the other document for display based on determining that the information identifying the other document is not included in the remove list.

8. The method of claim 1, where performing one of removing the document for the particular search, removing the document for the particular session, or removing the document for at least one of the plurality of searches or the plurality of sessions comprises:
   receiving information identifying the document;
   determining that the information identifying the document is included in a remove list; and
   providing information regarding an alternative document for display based on determining that the information identifying the document is included in the remove list.

9. A system comprising:
   a memory to store instructions;
   and a processor to execute the instructions to:
       provide, for display, information regarding a document;
       provide, for display, information regarding a plurality of options in connection with the information regarding the document,
           the plurality of options including:
               a first option for removing the document for a particular search,
               a second option for removing the document for a particular session, and
               a third option for removing the document for at least one of a plurality of searches or a plurality of sessions;
       receive information regarding a selection of the first option, the second option, or the third option as a selected option; and
       add, based on the selection, information identifying the document to a remove list associated with the selected option,
           the remove list being for the particular search when the selection is of the first option,
           the remove list being for the particular session when the selection is of the second option, and
           the remove list being for at least one of the plurality of searches or the plurality of sessions when the selection is of the third option.

10. The system of claim 9, where the processor is further to:
    receive the information identifying the document; and
    provide an alternative document after receiving the information identifying the document,
        the alternative document including information regarding the selection.

11. The system of claim 10, where, when providing the alternative document, the processor is further to:
    determine that the remove list includes the information identifying the document, and
    provide the alternative document based on determining that the remove list includes the information identifying the document.

12. The system of claim 10, where the alternative document further includes one or more of:
    a fourth option to access the document, or
    a fifth option to remove the information identifying the document from the remove list.

13. The system of claim 9, where the processor is further to:
    receive a search query;

identify a plurality of documents based on the search query, the plurality of documents including the document;

determine that the remove list includes the information identifying the document after identifying the plurality of documents;

remove a search result for the document, from a list associated with the plurality of documents to obtain a modified list, based on determining that the remove list includes the information identifying the document; and provide the modified list for display.

14. The system of claim 9, where the processor is further to:

receive information identifying another document;

determine that the information identifying the other document is not included in the remove list; and provide information regarding the other document for display based on determining that the information identifying the other document is not included in the remove list.

15. A non-transitory computer-readable medium storing instructions, the instructions comprising:

one or more instructions that, when executed by at least one processor, cause the at least one processor to:

provide, for display, information regarding a document;

provide, for display, a first option in connection with the information regarding the document, the first option being associated with removing the document for a particular search;

provide, for display, a second option in connection with the information regarding the document, the second option being associated with removing the document for a particular session;

provide, for display, a third option in connection with the information regarding the document, the third option being associated with removing the document for at least one of a plurality of searches or a plurality of sessions;

receive information regarding a selection of the first option, the second option, or the third option as a selected option; and add, based on the selection, information identifying the document to a remove list associated with the selected option, the remove list being for the particular search when the selection is of the first option, the remove list being for the particular session when the selection is of the second option, and the remove list being for at least one of the plurality of searches or the plurality of sessions when the selection is of the third option.

16. The non-transitory computer-readable medium of claim 15, where the instructions further comprise:

one or more instructions that, when executed by the at least one processor, cause the at least one processor to:

determine that the remove list includes the information identifying the document; and provide a list of search results based on determining that the remove list includes the information identifying the document, the list of search results excluding a search result for the document.

17. The non-transitory computer-readable medium of claim 16, where the one or more instructions to determine that the remove list includes the information identifying the document comprise:

one or more instructions that, when executed by the at least one processor, cause the at least one processor to:

receive a search query;

determine information associated with a user that submitted the search query;

identify the remove list based on the information associated with the user; and determine that the identified remove list includes the information identifying the document.

18. The non-transitory computer-readable medium of claim 15, where the remove list is one of a plurality of remove lists, the plurality of remove lists including:

a first remove list for the particular search, a second remove list for the particular session, and a third remove list for at least one of the plurality of searches or the plurality of sessions.

19. The non-transitory computer-readable medium of claim 18, where the one or more instructions to add the information identifying the document to the remove list comprise:

one or more instructions that, when executed by the at least one processor, cause the at least one processor to:

add the information identifying the document to the first remove list when the selection is a selection of the first option, add the information identifying the document to the second remove list when the selection is a selection of the second option, and add the information identifying the document to the third remove list when the selection is a selection of the third option.

20. The non-transitory computer-readable medium of claim 15, where the instructions further comprise:

one or more instructions that, when executed by the at least one processor, cause the at least one processor to:

receive the information identifying the document;

determine that the remove list includes the information identifying the document; and provide an alternative document based on determining that the remove list includes the information identifying the document.

* * * * *